Feb. 12, 1952  W. A. HUMPHREY  2,585,465
ELECTRIC TOASTER
Filed Dec. 5, 1947  3 Sheets-Sheet 1

INVENTOR.
Warren A. Humphrey
BY Harry S. Demarse
ATTORNEY.

Feb. 12, 1952  W. A. HUMPHREY  2,585,465
ELECTRIC TOASTER
Filed Dec. 5, 1947  3 Sheets-Sheet 2
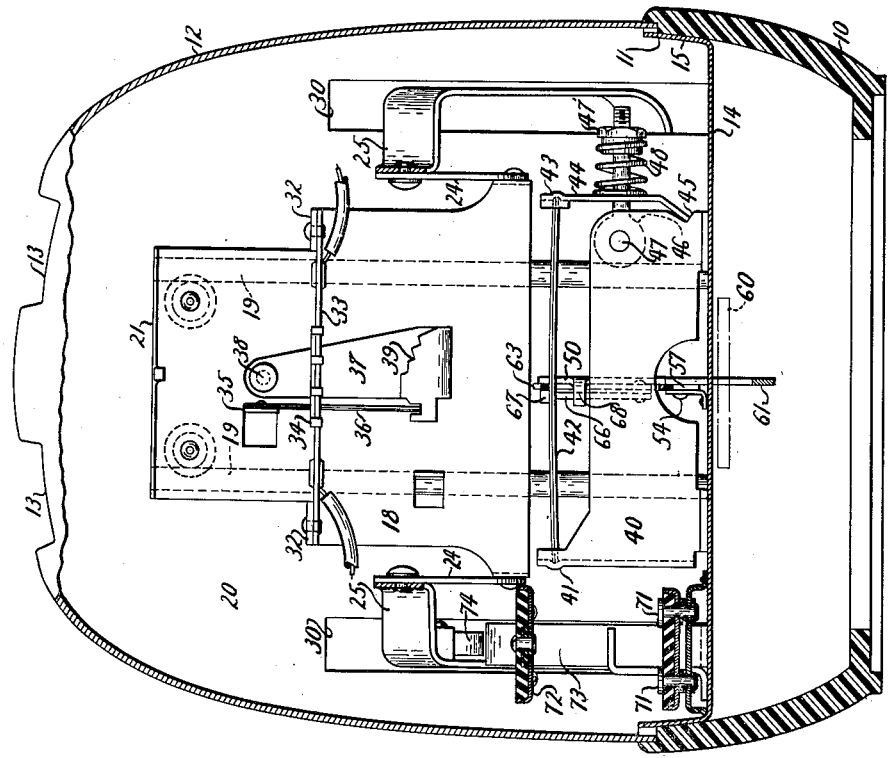
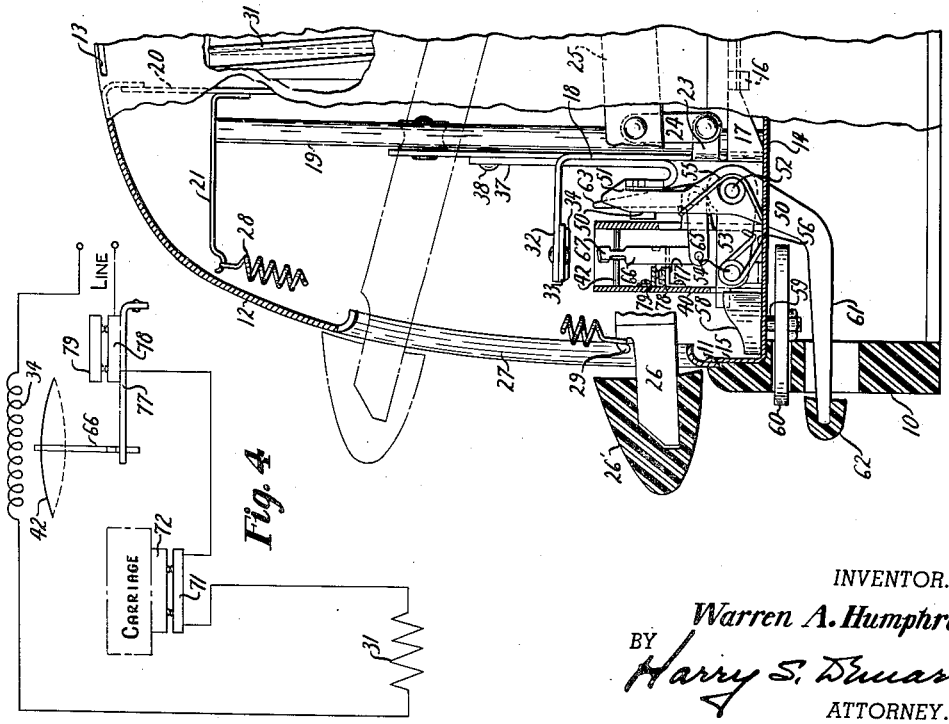
INVENTOR.
Warren A. Humphrey
BY Harry S. Dumars
ATTORNEY.

Feb. 12, 1952 W. A. HUMPHREY 2,585,465
ELECTRIC TOASTER
Filed Dec. 5, 1947 3 Sheets-Sheet 3

INVENTOR.
Warren A. Humphrey
BY
Harry S. Dinarss
ATTORNEY.

Patented Feb. 12, 1952

2,585,465

UNITED STATES PATENT OFFICE 2,585,465

ELECTRIC TOASTER

Warren A. Humphrey, Canton, Ohio, assignor to The Hoover Company, North Canton, Ohio, a corporation of Ohio Application December 5, 1947, Serial No. 789,869

18 Claims. (Cl. 99—329)

This invention relates to toasters and more particularly to a thermal timer for an electric toaster whereby the operator may prepare light, medium, or dark toast as desired.

This invention relates to the same general type of toaster timer disclosed and claimed in an application filed by Anthony G. Horvath, Serial No. 721,225, filed January 10, 1947.

As in the Horvath application, according to this invention, a second toasting operation cannot be begun immediately after a first until the thermal timer has cooled so that the timer will always be in perfect condition for timing a toasting operation. Also as in the Horvath application the operator may immediately insert new slices to be toasted without waiting for the thermal timer to cool and the toasting operation will be automatically initiated when the thermal timer has cooled without further attention from the operator.

This feature of the invention has particular utility because the user does not usually wish a second slice immediately after the first. However, according to this invention the user may immediately insert new slices to be toasted without waiting for the timer to cool and the toast will be ready for consumption by the time the user is ready for it.

More specifically according to this invention an auxiliary heater is provided for the thermal timer which is energized simultaneously with the main heaters which perform the toasting function. When a toasting operation is completed the auxiliary heater is moved away from the thermal timer along with the toast carriers so as to permit the thermal timer to quickly cool.

Manual means is provided for adjusting the timer so as to prepare light, medium, or dark toast in which the position of the auxiliary heater toward and away from the thermal timer is varied by means of a manual adjustment. More specifically the position of the latch for latching the carriers in lowered position is varied so as to vary the position of the auxiliary heater with relation to the timer in adjusting the timer for making light, medium, or dark toast.

Additionally, a compensating bimetal is provided which varies the position of a latch arm carried by the bread carriers which also varies the position of the auxiliary heater relative to the thermal timer with changes in toaster temperature which occurs with repeated rapid successive use of the toaster.

According to a second modification of this invention a thermal timer is provided which operates a single switch connected in series with the main heaters and the auxiliary heater so that the main and auxiliary heaters will be simultaneously energized and deenergized. The thermal timer and switch are so related to the latch release mechanism that the latch will be released simultaneously with the opening of the switch when the thermal timer reaches its hot position but the latch will immediately return to its latching position while the switch will remain open until the timer has cooled sufficiently to move to its cold position in a condition to time a following toasting operation.

According to another feature of this invention a thermal timer with an auxiliary heater is provided in which movement of the timer from cold position to hot position first operates to deenergize the auxiliary heater. Continued movement of the timer under the dynamic inertia of its associated parts releases the toast carriers for upward movement. The timer then recovers and moves backwardly toward its cold position sufficiently for the carriage latch to return to its original position but the switch remains open.

According to another feature of this invention a single switch is provided for simultaneously energizing the main heaters and an auxiliary heater. The switch is so constructed that it cannot be closed unless the bread carriers are in toasting position and the thermal timer is in its cold position. The construction is such that when the toaster and correspondingly the timer is cold movement of the bread carriers to toasting position will close the switch to energize both the main heaters and the auxiliary heater. When both the toaster and timer are hot and the bread carriers are latched in toasting position movement of the timer to its cold position will close the switch to simultaneously energize both the main heaters and the auxiliary heater.

Other objects and advantages of this invention will become apparent as the description proceeds when taken in connection with the accompanying drawings in which:

Figure 2 is a vertical cross-sectional view of the toaster and timer of Fig. 1;

Figure 3 is a front plan view of the toaster and timer of Fig. 1;

Figure 4 is a wiring diagram showing how the parts of the toaster and timer of Fig. 1 are electrically connected.

Figure 1:
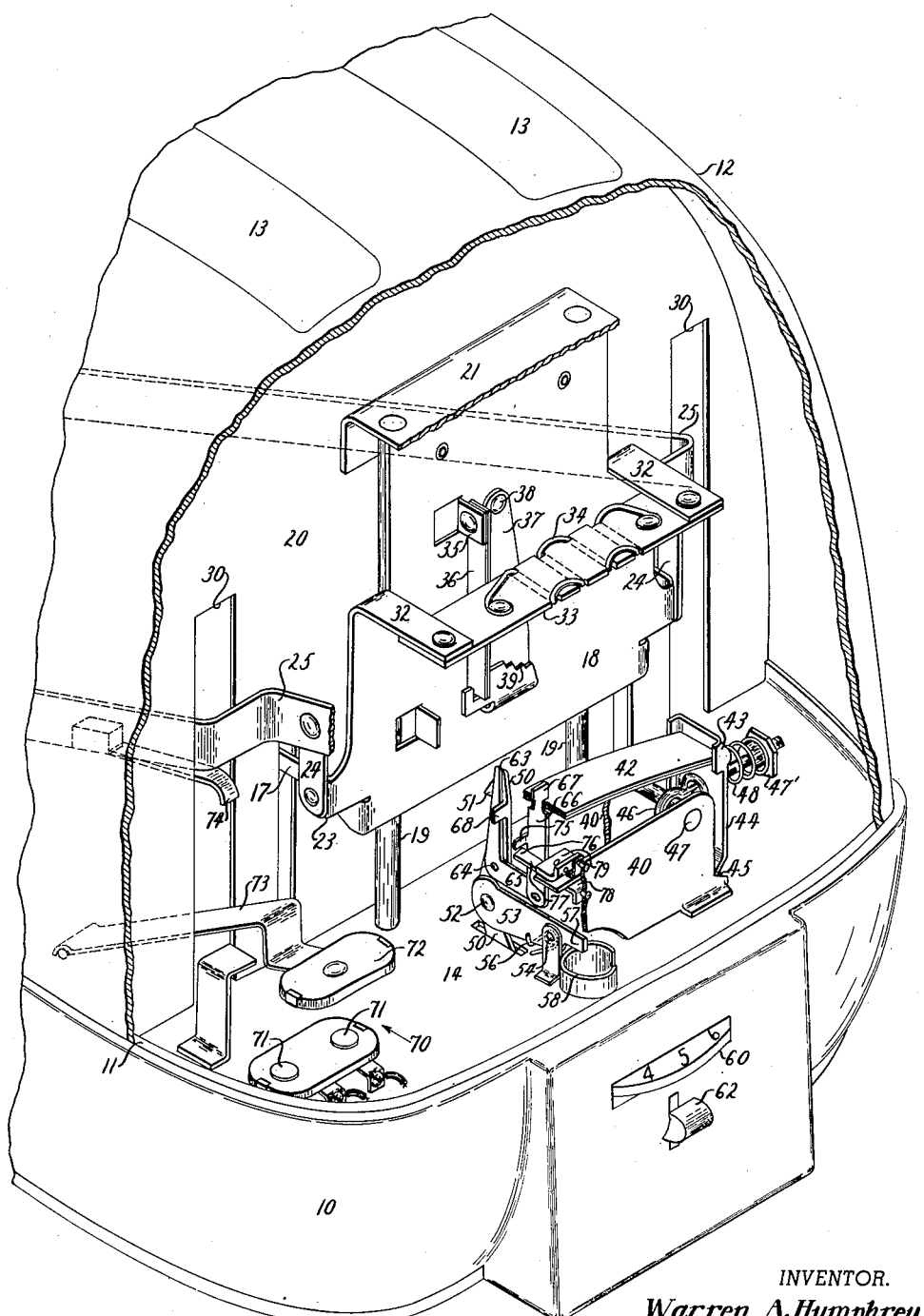
Figure 1 is a perspective view of a toaster with the parts broken away to better show the mechanism of the timer of this invention.

Referring to the drawings, the reference numeral 10 represents the base of the toaster of this invention. The base 10 is molded of a suitable insulating moldable material such as hard rubber, a phenolic condensation product or other such moldable material.

Mounted in a peripheral depression or ledge 11 in the upper edge of base 10 is an appearance housing 12 having a plurality of bread receiving slots 13 through which bread may be inserted as will presently appear. Supported inwardly of the ledge 11 of base 10 is a supporting plate 14 having an upwardly extending peripheral flange 15 which contacts the inner periphery of base 10. The supporting plate 14 supports the entire mechanism of the toaster within the appearance housing 12.

Immediately beneath the slots 13 are bread carriers 16 carried by lugs 17 struck rearwardly from a carriage plate 18. The carriage plate 18 is mounted for vertical reciprocation in a manner well known in the art by guide rods 19. At their lower ends the guide rods 19 are rigidly secured to the supporting plate 14 and their upper ends are secured to a dividing plate 20 by a bracket 21. The dividing plate 20 divides the interior of the toaster into a toasting oven and a mechanism compartment.

Struck rearwardly from the carriage plate 18 are a pair of lugs 23, carrying pivoted links 24, which are pivoted at their upper ends to arms 25. The arms 25 are pivoted at their rearward ends to the side walls of the toasting oven in a manner well known in the art and at their forward ends are extended forwardly at 26 through a vertically extending slot 27 in the front of the appearance housing 12. The arms 25 and their associated parts are biased upwardly by a tension spring 28 anchored at its upper end to the bracket 21 and attached at its lower end to hook 29 on the extensions 26 of the arms 25. A manipulating handle 26' is attached to the extensions 26 of arms 25.

The dividing plate 20 is provided with slots 30 for the vertical reciprocation of arms 25. Similar slots, as shown in Fig. 1, are provided in the dividing plate 20 for the vertical reciprocation of lugs 17 to which the carriers 16 are attached.

Main heating elements 31 are positioned on each side of the carriers 16 to perform the toasting function. Struck forwardly from the carriage plate 18 are a pair of arms 32 which carry an insulating plate 33 upon which is wound an auxiliary heater 34.

Also struck forwardly from the carriage plate 18 is a lug 35 to which is secured one end of a compensating bimetal 36. The free end of the compensating bimetal engages the lower end of a latch arm 37 pivoted to the carriage plate 18 at 38. The lower or free end of latch arm 37 carries a plurality of stepped serrations 39 for a purpose which will presently appear.

Secured to the supporting plate 14 is an inverted U-shaped bracket 40. At one end, as shown in Fig. 3, the bracket 40 has a depression 41 to receive one end of a snap acting timing bimetal 42. The opposite end of the timing bimetal 42 is supported in a depression 43 in an arm 44 pivoted to the bracket 40 at 45. An eye bolt 46 is pivoted at 47 between the legs of the bracket 40. The eye bolt 46 extends through an opening in the pivoted arm 44 and carries a nut 47' which applies pressure to the outer end of a compression spring 48 which in turn abuts at its other end against the arm 44 so as to apply pressure to the timing bimetal 42 in the direction of its length so as to cause the timing bimetal 42 to snap from an upper over-center position to a lower over-center position as will presently appear.

Cooperating with the serrations 39 on the latch arm 37 is a carrier latch 50 having a hook 51 adapted to overlie one of the serrations 39 when the carriage plate 18 is moved to downward position. The carriage latch 50 is pivoted at 52 to one end of a lever arm 53 which is pivoted intermediate its ends at 54 on the supporting plate 14. The carriage latch 50 is biased clockwise as viewed in Fig. 2 by a spring 55. The arm 53 is biased counterclockwise as viewed in Fig. 2 by a spring 56.

The other end 57 of arm 53 cooperates with a cam 58 mounted for rotation on supporting plate 14 by means of a shaft 59. The lower end of the shaft 59 carries a hand wheel 60 extending through a slot in the front of the base 10 for ease in manipulation as will presently appear.

The lower end 61 of carriage latch 50 extends through an opening in the front of the base 10 beneath the hand wheel 60 so that the operating knob 62 may be pushed downwardly to release the carriage latch 50 independently of the timer.

A bell-crank 63 is pivoted to the carriage latch 50 at 64. Extending upwardly from the end 65 of the bell-crank 63 is a link 66 having an offset end 67 extending through an opening in the central portion of the timing bimetal 42. The upper end of bell-crank 63 is adapted to engage the lug 68 of carriage latch 50 to release the carriage latch 50 as will be described presently.

The main heaters 31 and the auxiliary heater 34 are connected in series with a switch 70 so that, under certain conditions, when the switch 70 is closed both the main heaters 31 and the auxiliary heater 34 are energized and when switch 70 is open both heaters are deenergized.

The switch 70 includes a pair of fixed contacts 71 insulatedly supported on supporting plate 14 and a bridging contact 72 insulatedly supported on the free end of a spring arm 73 also supported on the supporting plate 14. The spring arm 73 normally holds the bridging contact 72 separated from the fixed contacts 71 and is pressed downwardly by a member 74 secured to the left arm 25.

Mounted on the link 66 is a lug 75 which cooperates with the free end 76 of a spring arm 77 mounted on one of the legs of bracket 40. A bridging contact 78 is insulatedly mounted intermediate the ends of the spring arm 77 to cooperate with a pair of fixed contacts 79 insulatedly supported on bracket 40 above the bridging contact 78. When the timing bimetal 42 is up in its upper over-center position the lug 75 is positioned upwardly above the end 76 of the spring arm 77 so that the spring arm 77 will hold the bridging contact 78 in engagement with the fixed contacts 79. As shown in Fig. 4 the contacts 79 are connected in series with the contacts 71 and in series with the main heaters 31 and the auxiliary heater 34.

As shown in Figs. 1 and 2 the lug 68 on latch 50 is positioned a considerable distance away from the upper end of the bell crank 63 so that when the timing bimetal 42 snaps downwardly the inertia of the parts will cause the upper end of the bell crank 63 to strike the lug 68 with a hammer blow so as to remove the hook 51 from above the serrations 39 and release the carriers 16. The arrangement is such that prior to the release of carriage latch 50 the lug 75 will contact the end 76 of spring 77 and remove the bridging contact 78 from engagement with the fixed contacts 79.

It has been found in actual practice that after the timing bimetal 42 has snapped downwardly it will immediately recover so as to move upwardly a considerable distance which will permit the spring 55 to move the carriage latch 50 back to its original position beneath the latch arm 37. However, the parts are so related that the lug 75 will still engage the end 76 of spring arm 77 and hold the bridging contact 78 separated from the fixed contacts 79.

*Operation of Figures 1 to 4 inc.*

If the operator desires dark toast he will rotate the hand wheel 60 until the lowest point of cam 58 engages the end 57 of lever arm 53 so that the spring 56 will raise the hook 51 of carriage latch 50 upwardly. This will cause the carriage plate 18 and correspondingly in the auxiliary heater 34 to be positioned higher above the timing bimetal 42 so that heat will be transmitted to the timing bimetal 42 at a slower rate so as to lengthen the toasting interval as will presently appear.

Bread will then be inserted through the openings 13 so as to rest on carriers 16. The handle 26' will then be manipulated to lower the carriers 16 and the carriage plate 18 to toasting position so that the bread will be positioned between the heaters 31.

The toaster being cold at this time, the compensating bimetal 36 will also be cold so as to hold the latch arm 37 counter-clockwise as viewed in Fig. 1. The cam surface above the hook 51 of carriage latch 50 will engage the latch arm 37 and pivot the carriage latch 50 clockwise as viewed in Fig. 1, until the hook 51 engages over the highest of the serrations 39 on the latch arm 37 to latch the carriage plate 18 and carriers 16 downwardly. This will position the auxiliary heater 34 above the timing bimetal 42 but in a position closer to the timing bimetal 42 than would be the case when the toaster is hot so that heat will be transmitted to the timing bimetal faster than when the toaster is hot.

At the same time the member 74 will engage the spring arm 73 so as to bring the bridging contact 72 into engagement with the fixed contacts 71 to simultaneously energize both the main heaters 31 and the auxiliary heater 34.

Heat from the auxiliary heater 34 will gradually heat the timing bimetal 42 and cause it to move downwardly until it moves past its dead center position. The spring 48 will then snap it to its lower over-center position to cause the end 67 of link 66 to snap downwardly and pivot the bell-crank 63 clockwise as viewed in Fig. 1. The dynamic inertia of the moving parts will cause the upper end of the bell-crank 63 to engage the lug 68 of carriage latch 50 with considerable force and move it clockwise as viewed in Fig. 1 to move the hook 51 from above the serrations 39. Just prior to the release of latch 50 the lug 75 will engage the end of spring arm 76 and separate the contacts 78 and 79 to deenergize the entire toaster.

The spring 28 will then bias the carriage plate 18 and the carriers 16 upwardly to receiving position and permit the spring 73 to open the switch 70.

When the timing bimetal 42 snaps to its lower over-center position it imparts considerable inertia to the bell-crank 63 and its associated parts so that the upper end of the bell-crank 63 imparts a hammer blow to the lug 68 of carriage latch 50 to remove the hook 51 from above the serration 39. The timing bimetal 42 will be drawn along with the arm 66 due to the inertia of the parts but will immediately recover and move upwardly sufficiently to move the upper end of bell-crank 63 away from the lug 68 to permit the spring 55 to return the carriage latch 50 to a position beneath the latch arm 37 ready for the next succeeding toasting operation. However, the parts are so related that the lug 75 will still engage the end 76 of spring 77 and hold the bridging contact 78 out of engagement with the fixed contacts 79.

If additional toast is desired the operator may immediately insert new slices through openings 13 in the appearance housing 12 and again move the carriers 16 to toasting position as before. The carriage latch 50 being positioned beneath the latch lever 37 the hook 51 will engage over one of the serrations 39 to latch the carriers 16 and carriage plate 18 in downward position. However, since the timing bimetal 42 is still hot and in its downward over-center position the lug 75 will still be in engagement with the end 76 of spring arm 77 so as to hold the bridging contact 78 separated from the fixed contacts 79. Thus, neither the main heaters 31 nor the auxiliary heater 34 will be energized even though the switch 70 is closed by movement of the carriage plate 18 to downward position.

It has been found that the timing bimetal 42 will cool sufficiently to snap to its upper over-center position within a few seconds after it snaps downwardly. This will cause the link 66 to move upwardly and remove the lug 75 from engagement with the end 76 of spring arm 77 to permit the spring arm 77 to bring the bridging contact 78 into contact with the fixed contacts 79 and simultaneously energize both the main heaters 31 and the auxiliary heater 34 to initiate the next succeeding toasting operation.

The toaster will then operate as before except that the toaster will be hot so as to require a shorter toasting interval. The timing bimetal 42 will also be hotter so that it will require less heat to cause it to move to its lower over-center position. In order to prevent over-compensation of the timing bimetal 42 the free end of the compensating bimetal 36 will have moved to the left as viewed in Fig. 1. This will have moved the latch arm 37 clockwise so that the hook 51 of carrier latch 50 will engage a lower one of the serrations 39. That will cause the carriage plate 18 to be latched in a higher position than for the first toasting operation so that heat will be transferred from an auxiliary heater 34 to the timing bimetal 42 at a slower rate just sufficient to compensate for the tendency of the timing bimetal 42 to over-compensate.

Thus, while the second toasting operation will be shorter, the rate of heat transfer from the auxiliary heater 34 to the timing bimetal 42 will be slower than for the first toasting operation. This is necessary because the timing bimetal 42 will also be correspondingly hotter than the toaster as a whole than for the first toasting operation.

For continued successive toasting operation the compensating bimetal 36 will continue to move to the left as viewed in Fig. 1 and move the latch arm 37 clockwise until the hook 51 of carriage latch 50 will engage a lower serration 39 causing the auxiliary heater 34 to be positioned farther and farther away from the timing bimetal 42 until a condition of equilibrium is reached.

If the operator desires medium or light toast the hand wheel 60 is rotated so that a higher point of cam 58 will engage the end 57 of arm 53 so as to move the hook 51 of carriage latch 50 downwardly to cause the auxiliary heater 34 to be positioned closer to the timing bimetal 42 and shorten the duration of the toasting interval to produce medium or light toast.

While the lug 75 will also move upwardly when the wheel 60 is rotated to raise the carriage latch 50 the amount of this movement is small in relation to the distance the lug 75 moves when the timing bimetal 42 moves to its lower over-center position. The parts are so arranged that the lug 75 will still engage the end 76 of spring arm 77 to hold the contacts 78 and 79 separated when the timing bimetal is in its lower over-center position regardless of the position in which the carriage latch 50 is placed by manipulation of the adjusting wheel 60.

If at any time it is desired to stop the toasting operation or to inspect the toast during a toasting interval the knob 62 is moved downwardly to pivot the carriage latch 50 clockwise as viewed in Fig. 1 to release the carriers 16 for upward movement. The carriers 16 may be immediately moved downwardly again to continue the toasting operation.

Figure 5:
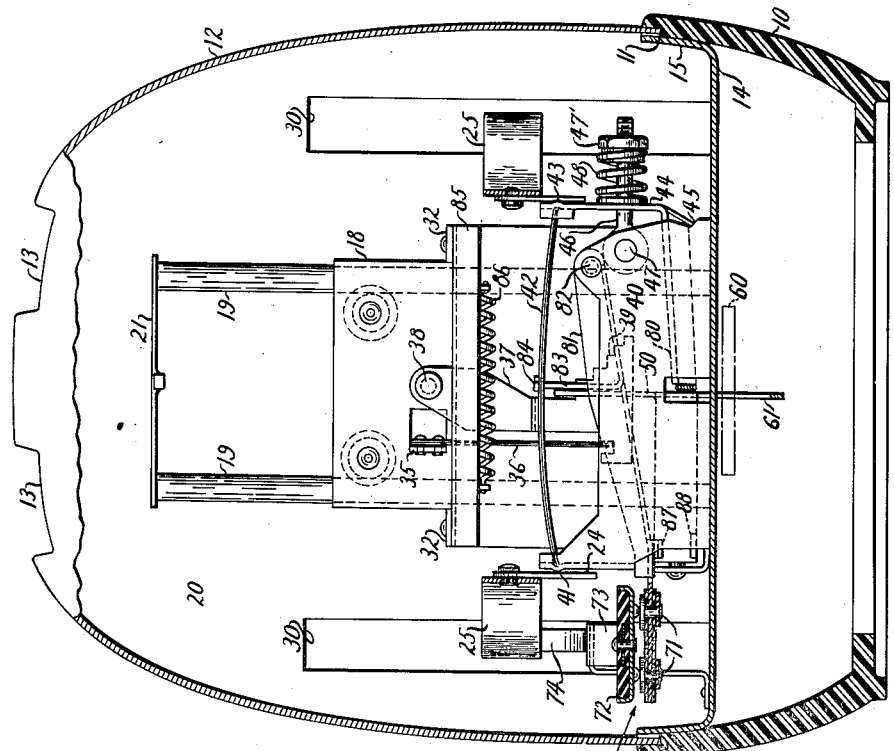
Figure 5 is a front plan view of a modification of the invention.
Figure 6:
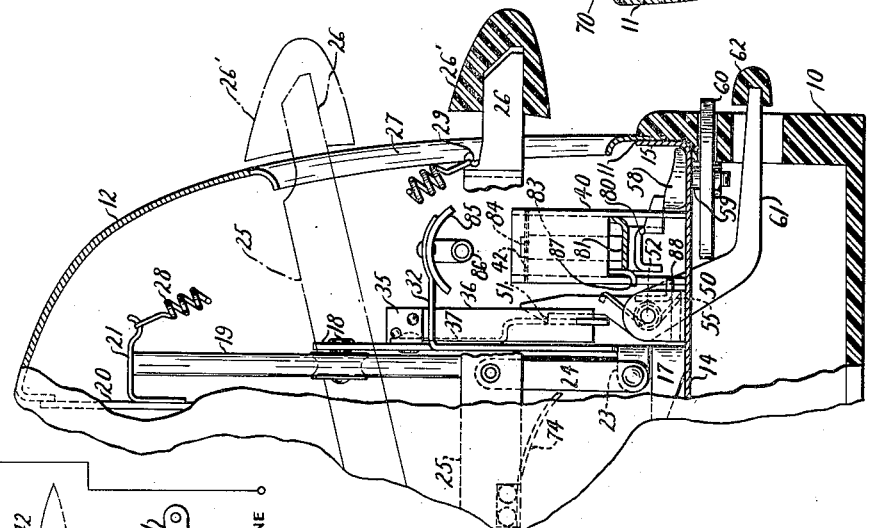
Figure 6 is a vertical cross-sectional view of the toaster and timer of Fig. 5.
Figure 7:
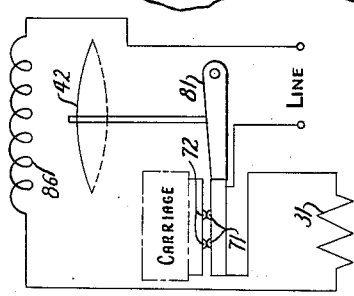
Figure 7 is a wiring diagram showing how the parts of the toaster and timer of Figs. 5 and 6 are electrically connected.

The modification of Figs. 5, 6, and 7 is similar to that of Figs. 1, 2, 3, and 4 and where the parts are the same they have been given the same reference characters.

The arm 44 which applies pressure to the bimetal timer 42 has a lug 80 struck therefrom so that its free end overlies the cam 58. This constitutes the modified manual adjustment for adjusting the timer for producing light, medium, or dark toast. As viewed in Fig. 5 the free end of the lug 80 is in engagement with the lowest point of the cam 58. This will permit the arm 44 to move to the limit of its movement in a counter-clockwise direction as viewed in Fig. 5 to place a maximum compression on the ends of the timing bimetal 42. This is the setting for dark toast because the timing bimetal 42 will have to absorb a greater quantity of heat before it will snap to its lower over-center position. The rate of application of heat to the timing bimetal 42 remaining the same, the above adjustment will lengthen the duration of the toasting interval. If the medium or light toast is desired the wheel 60 is rotated so that the free end of the lug 80 will ride up the incline of cam 58 and pivot the arm 44 clockwise as viewed in Fig. 5 to thereby lessen the pressure on the ends of the timing bimetal 42. This in turn will reduce the quantity of heat necessary to cause the timing bimetal 42 to snap to its lower over-center position and accordingly will shorten the toasting interval.

In the modification of Figs. 5 and 6 the contacts 71 are not fixedly mounted on the supporting plate 14 but are carried by the free end of a latch release arm 81 pivoted to the bracket 40 at 82. A lug 83 is struck upwardly from the central portion of the arm 81 and extends through the central portion of the timing bimetal 42. The upper end 84 of the lug 83 is turned at right angle to the body of the lug above the timing bimetal 42 in the same way as the lug 67 of arm 66 as shown in Fig. 1. The switch 70 of this modification performs the function of both of the switches shown in the modification of Figs. 1 to 4, inclusive.

As shown in Fig. 6 the arm 81 has a lug 87 adapted to engage a lug 88 on latch release arm 50 to release the latch 50 by applying a hammer blow to the lug 88 as the free end of arm 81 moves downwardly.

As shown in Fig. 5, the arms 32 carry a reflector 85. Carried by the reflector 85 immediately below its reflecting surface is an auxiliary heater 86 in the form of a coiled wire. The reflector 85 and the auxiliary heater 86 lie immediately above the timing bimetal 42 when the carriage plate 18 is moved to downward position.

*Operation of Figures 5, 6, and 7*

The operation of this modification is substantially the same as that of the first modification. Bread is inserted through openings 13 so as to rest upon carriers 16. The handle 26' is manipulated to move the carriage plate 18 and the carriers 16 to toasting position. As in the first modification the lower end of the latch arm 37 will engage the cam above the hook 51 of the carriage latch 50 and pivot the carriage latch 50 clockwise as viewed in Fig. 6 until the hook 51 overlies one of the serrations 39 of latch arm 37 so as to latch the carriers 16 and carriage plate 18 in their lowered position.

As in the first modification the lug 74 on the left arm 25 will engage the spring arm 73 and move the bridging contact 72 downwardly. Since the timing bimetal 42 is cold the arm 81 will be in its clockwise position and the spaced contacts 71 will be in a position to be engaged by the bridging contact 72. This will energize both the main heaters 31 and the auxiliary heater 86.

Downward movement of the carriage plate 18 will also move the reflector 85 and the auxiliary heater 86 downwardly to a position immediately above the timing bimetal 42 depending upon the position of the compensating bimetal 36 as in the first modification.

Heat will be radiated directly to the timing bimetal 42 from the auxiliary heater 86 and will also be reflected thereto by the reflector 85. The timing bimetal 42 will heat up until it moves past its dead center position at which time it will be snapped to its lower over-center position under the influence of the spring 48.

Snapping of the timing bimetal 42 to its lower over-center position will pivot the arm 81 counter-clockwise as viewed in Fig. 5 with considerable force so as to first move the contacts 71 away from the bridging contact 72 and then move the carriage latch 50 clockwise as viewed in Fig. 6 by means of the lug 87 of the lever 81 striking a hammer blow to the lug 88 on the carriage latch 50. This will release the carriage plate 18 and carriers 16 for upward movement under the bias of the spring 28 to move the auxiliary heater 86 and reflector 85 upwardly away from the timing bimetal 42 and to permit the spring 73 to move the bridging contact 72 upwardly.

The dynamic inertia of the arm 81 will carry the central portion of the timing bimetal 42 past its normal lower over-center position to permit the lug 87 to strike a hammer blow to the lug 88 so as to release the carriage latch 50. However, the central portion of the timing bimetal 42 will recover immediately and move upwardly so as to engage the lug 84 and pivot the arm 81 clockwise to move the lug 87 away from lug 88 so that the spring 55 will return the carriage latch 50 to its original position.

The spaced contacts 71 will also move upwardly slightly but not sufficiently to be contacted by the bridging contact 72 should the carriers 16 be moved downwardly again before the timing bimetal 42 has cooled sufficiently to return to its upper over-center position.

Should a second toasting operation be initiated immediately after a first the contacts 71 will remain separated from the bridging contact 72 until the timing bimetal 42 has cooled sufficiently to return to its upper over-center position. However, the carriage plate 18 and carriers 16 will be latched downwardly because the carriage latch 50 has returned to its original position. When the timing bimetal 42 has cooled sufficiently to return to its upper over-center position its central portion will engage the lug 84, pivot the arm 81 clockwise and reengage contacts 71 and 72 to simultaneously reenergize both the main heaters 31 and the auxiliary heater 86. Thus, if the second toasting operation is begun before the timing bimetal 42 is cool, the operator need not pay any further attention to the toaster after having moved the carriers 16 to toasting position. The cooling of the timing bimetal will automatically initiate the second toasting interval without further attention from the operator.

The compensating bimetal 36 will automatically move the latch arm 37 to vary the lower position of the carriage plate 18 to vary the position of the reflector 85 and auxiliary heater 86 relative to the timing bimetal 42 with changes in toaster temperature as in the first modification.

From the foregoing it can be seen that in each of the modifications of this invention the inertia of the latch release lever is used to strike a hammer blow to the carriage latch to release the same. The inertia of the latch release lever carries the timing bimetal past its normal downward over-center position and the timing bimetal immediately recovers to permit the carriage latch to return to its normal position while holding the switch open to prevent reenergization of the heaters until the timer has cooled, thus permitting the carriers to be latched downwardly immediately after a preceding toasting operation.

Also according to both modifications of this invention a movable latch arm is carried by the carriage plate with a compensating bimetal to so move the latch arm to vary the position of the auxiliary heater relative to the timer so as to vary the toasting intervals with variations in toaster temperature caused by rapid repeated use.

According to the first modification of this invention the lowermost position of the toast carriers and the auxiliary heater carried thereby is varied manually by varying the vertical position of the carriage latch and thermostatically with variations in toaster temperature by thermally moving a latch lever carried by the carriers so as to vary the distance between the auxiliary heater and timer to vary the toasting interval both manually and thermostatically with variations in toaster temperature.

According to the second modification of this invention the timing interval is varied manually by applying varying pressures to the ends of the timing bimetal and thermostatically by varying the position of the latch lever carried by the carriers to vary the distance between the auxiliary heater and reflector and the timing bimetal.

Also according to the second modification of this invention a single switch mechanism is provided which cannot be closed unless the carriers are in downward position and the timing bimetal is in its cold position.

While I have shown but two modifications of this invention it is to be understood that these modifications are to be taken as illustrative only and not in a limiting sense. I do not wish to be limited to the particular structure shown and described but to include all equivalent variations thereof except as limited by the scope of the claims.

I claim:

1. A toaster comprising, main heaters for performing the toasting function, bread carriers movable from receiving to toasting position adjacent said main heaters, means for latching said carriers in toasting position, a thermal timer having a hot stable position and a cold position for timing the duration of the toasting intervals, said latching means being operable to latch said carriers in toasting position whether said timer is in its hot position or its cold position, latch releasing means operable upon movement of said timer from its cold position for releasing said latching means, auxiliary means for heating said timer to cause it to move from its cold position to its hot position, switch means operable upon movement of said carriers to toasting position for energizing said auxiliary heating means, means actuated by movement of said latch releasing means to releasing position operable to actuate said switch means to deenergize said auxiliary heating means, said latch releasing means being operable to move said timer past its hot stable position as it is released the arrangement being such that said timer will immediately return said latch means to its original position while said switch means remains in deenergizing position until said timer returns to its cold position.

2. A toaster comprising, main heaters for performing the toasting function, bread carriers movable from receiving to toasting position adjacent said main heaters, means for latching said carriers in toasting position, a thermal timer movable from a cold position to a hot position upon being heated and back to its cold position upon cooling, said latching means being operable to latch said carriers in toasting position when said timer is in its hot or cold positions, auxiliary means for heating said timer to cause it to move from its cold position to its hot position in timing the duration of toasting intervals, switch means operable upon movement of said carriers to toasting position and movement of said timer to its cold position to energize said auxiliary heating means, releasing means operable by movement of said timer from its cold position for releasing said latch means, said switch means being operable by movement of said releasing means for deenergizing said auxiliary heating means, said latch releasing means being operable to move said timer past its hot stable position as it is released the arrangement being such that said latch means will immediately return to its original position while said switch means will remain in its deenergizing position until said timer returns to its cold position.

3. A toaster comprising, a base, main heaters for performing the toasting functions, bread carriers movable from receiving to toasting position adjacent said main heaters, means for latching said carriers in toasting position, a thermal timer movable from a cold position upon being heated and back to its cold position upon cooling, auxiliary heating means for causing said timer to move from its cold position to its hot position to time the duration of toasting intervals, said latching means being operable to latch said carriers in toasting position when said timer is in its hot or cold positions, releasing means operable upon movement of said timer from its cold position for releasing said latch means, a spring-biased switch contact means carried by said base in a position to be moved downwardly by movement of said carriers to toasting position, switch contact means carried by said releasing means for cooperating with said spring-biased switch contact means for energizing and deenergizing said heating means, said second switch means being closed only when said timer is in its cold position, the arrangement being such that both of said switch contact means are in energizing position only when said carriers are in toasting position and said timer is in its cold position.

4. A toaster according to claim 3 in which said latch means returns immediately to its original position after releasing said carriers and said switch contact means remains in deenergizing position until said timer returns to its cold position and said carriers are returned to toasting position.

5. A toaster comprising, main heaters for performing the toasting function, bread carriers movable from receiving to toasting position adjacent said main heaters, a snap-acting thermal timer for timing the duration of toasting intervals, auxiliary heating means for said timer to cause it to move from its cold over-center position to its hot over-center position, means for latching said carriers in toasting position whether said timer is in its hot or cold position, switch means for energizing said heating means, and latch release means for opening said switch means and for releasing said latch means upon movement of said timer from its cold over-center position, the arrangement being such that normal movement of said timer to its hot over-center position opens said switch means and the dynamic inertia of said releasing means carries said timer beyond its normal hot position to release said latch means to permit said timer to return said latch means to its original position while said switch means will remain open until said timer returns to its cold position and said carriers are returned to toasting position.

6. A toaster comprising, a base, bread carriers movable from receiving to toasting position, a thermal timer having a hot position and a cold position mounted on said base, a heater for said timer carried by said carriers in a position directly above said timer when said carriers are in toasting position, a movable latch arm carried by said carriers, a latch mounted on said base in a position to cooperate with said latch arm to latch said carriers in toasting position and thermally responsive means for varying the position of said latch arm relative to said carrier so as to latch said carriers in varying positions relative to said base and thus vary the position of said heater relative to said timer when said carriers are in toasting position whereby the duration of the toasting intervals is varied with variations in toaster temperature.

7. A toaster according to claim 6 including manually operable means for moving said latch toward and away from said base so as to further vary the position of said heater relative to said timer in adjusting for light, medium, and dark toast.

8. A toaster according to claim 6 including manually operable means to vary the operation of said timer so as to lengthen or shorten the toasting interval in adjusting the timer for making light, medium, or dark toast.

9. A toaster according to claim 6 including manually adjustable means for applying resistance to movement of said timer from its cold position to its hot position in adjusting said timer for making light, medium, or dark toast.

10. A toaster comprising, a base, bread carriers movable from receiving to toasting position, a snap-acting bimetallic timer supported between its ends so as to have a cold over-center position and a hot over-center position, said timer being mounted on said base, a heater carried by said carriers so as to be positioned directly above said timer when said carriers are in toasting position, a pivoted latch arm carried by said carriers, said latch arm having a plurality of vertically spaced stepped serrations, a latch mounted on said base for cooperating with the stepped serrations of said latch arm for latching said carriers in toasting position, thermally responsive means responsive to variations in toaster temperature for moving said latch arm to cause a higher serration of said latch arm to engage said latch when the toaster is cold and a lower serration of said latch arm to engage said latch when the toaster is hot.

11. A toaster according to claim 10 including manually actuatable means to vary the operation of said timer so as to vary the duration of the toasting interval in adjusting said timer for preparing light, medium, or dark toast.

12. A toaster according to claim 10 including manually actuatable means to further vary the position of said heater relative to said timer when said carriers are in toasting position in adjusting said timer for preparing light, medium, or dark toast.

13. A toaster according to claim 10 including manually actuatable means for applying varying pressures to the ends of said timer in adjusting said timer for preparing light, medium, or dark toast.

14. A toaster according to claim 10 including manually actuatable means for vertically moving said latch toward and away from said base to further vary the position of said heater relative to said timer when said carriers are in toasting position in adjusting said timer for preparing light, medium, or dark toast.

15. A toaster comprising, a base, bread carriers movable from receiving to toasting position, a thermal timer for timing the duration of toasting intervals, heating means for performing the toasting function and for heating said timer to cause it to time the toasting intervals, means for latching said carriers in toasting position, a pair of fixed contacts carried by said base, a spring arm mounted on said base and biased in an upward direction, a bridging contact carried by said spring arm above said fixed contacts, a latch release arm mounted on said base and operable by movement of said timer to its hot position for releasing said latching means, a second pair of fixed contacts, bridging contact carried by said latch releasing lever, said contacts being connected in series with said heating means, means carried by said carriers for depressing said spring arm downwardly to bring said bridging contact into engagement with said first pair of fixed contacts when said carriers are moved to toasting position and said timer is in its cold position, said releasing lever being so constructed and arranged that movement of said latch releasing lever to releasing position moves said second bridging contact from engagement with said second pair of fixed contacts and thereafter releases said latch, said timer being arranged to immediately return said latch to its original position while said bridging contact remain separated from said second pair of fixed contacts until said timer returns to its cold position even though said carriers are returned to toasting position.

16. A toaster according to claim 15 in which the dynamic inertia of said latch release lever moves said timer and lever past their normal hot position in releasing said latch means and said timer immediately returns to its normal hot position to remove said latch release lever from engagement with said latch so as to permit said latch to return to its original position while said contacts are maintained separated until said timer returns to its cold position and said carriers are moved to toasting position.

17. A toaster comprising, bread carriers movable from receiving to toasting position, means for latching said carriers in toasting position, a snap-acting thermal timer for timing the duration of toasting intervals, said timer having a cold over-center position and a hot over-center position, heating means for simultaneously applying heat for performing the toasting function and for heating said timer, said latch means being operable to latch said carriers in toasting position when said timer is in its hold or cold positions, switch means for energizing said heating means by movement of said carriers to toasting position when said timer is in its cold over-center position, latch release means having considerable mass connected to said timer to be actuated by movement of said timer from its cold over-center position to its hot over-center position to first actuate said switch means to deenergize said heating means and to thereafter move past its switch actuating position due to its dynamic inertia to release said latch means.

18. A toaster according to claim 17 in which said timer immediately restores said latch release means to a position in which said latch is in a position to latch said carriers in downward position while said switch means is maintained in heater deenergizing position until said timer returns to its cold over-center position and said carriers are again moved to toasting position.

WARREN A. HUMPHREY.

REFERENCES CITED

The following references are of record in the file of this patent:

UNITED STATES PATENTS

| Number | Name | Date |
| --- | --- | --- |
| 2,076,774 | Graham | Apr. 13, 1937 |
| 2,099,210 | Ireland | Nov. 16, 1937 |
| 2,101,062 | Graham | Dec. 7, 1937 |
| 2,262,285 | Ireland | Nov. 11, 1941 |
| 2,271,485 | Koci | Jan. 27, 1942 |
| 2,302,117 | Gomersall | Nov. 17, 1942 |
| 2,426,620 | Koci | Sept. 2, 1947 |
| 2,436,735 | Walker et al. | Feb. 24, 1948 |